United States Patent [19]

Walberg et al.

[11] Patent Number: 5,398,794
[45] Date of Patent: Mar. 21, 1995

[54] OVERHEATING PROTECTION DEVICE FOR ROTATIONAL CONTROL APPARATUS

[75] Inventors: David Walberg; Kent Carlson, both of Britton, S. Dak.

[73] Assignee: Horton Industries, Inc., Minneapolis, Minn.

[21] Appl. No.: 70,673

[22] Filed: Jun. 2, 1993

[51] Int. Cl.$^6$ .................. F16D 25/14; F16D 43/25; F15B 13/04; F16K 17/00
[52] U.S. Cl. ................. 192/85 A; 91/419; 137/74; 137/457; 192/82 T; 192/101
[58] Field of Search .............. 91/419; 137/74, 457; 192/82 T, 85 A, 101; 220/89.4

[56] References Cited

U.S. PATENT DOCUMENTS

| | | |
|---|---|---|
| 768,384 | 8/1904 | Lockwood ............... 137/74 |
| 2,172,311 | 9/1939 | Thomas ............... 220/89.4 X |
| 2,357,620 | 9/1944 | Thomas ............... 220/89.4 |
| 2,614,396 | 10/1952 | Ratermann ............... 192/85 A X |
| 2,742,179 | 4/1956 | Livers ............... 220/89.4 |
| 3,109,555 | 11/1963 | Samans ............... 220/89.4 |
| 3,253,687 | 5/1966 | Young . | |
| 3,409,305 | 11/1968 | Nieland . | |
| 3,517,683 | 6/1970 | Chandler ............... 137/74 |
| 3,762,517 | 10/1973 | Hanks ............... 192/85 AB |
| 4,199,048 | 4/1980 | Ishikawa ............... 192/82 T X |
| 4,226,095 | 10/1980 | Loken ............... 192/70.2 X |
| 4,352,365 | 10/1982 | Boccardo et al. ............... 137/74 X |
| 4,423,803 | 1/1984 | Malloy ............... 192/82 T X |
| 4,456,110 | 6/1984 | Hanks ............... 192/82 T |
| 4,570,849 | 2/1986 | Klaucke et al. ............... 91/419 X |
| 4,628,953 | 12/1986 | Correll et al. ............... 220/89.4 X |
| 4,877,117 | 10/1989 | Kniebel et al. ............... 192/85 A |

FOREIGN PATENT DOCUMENTS

1093304 11/1967 United Kingdom .

*Primary Examiner*—Rodney H. Bonck
*Attorney, Agent, or Firm*—Peterson, Wicks, Nemer & Kamrath

[57] ABSTRACT

A device (110) for protecting a clutch (C) against overheating from externally caused problems such as rapid cycling is disclosed including a heat conductive plug (120) sealed in an escape port (116) of a fitting (112) by fuse material (124) such as lead. The fitting (112) is threadably, sealably received in a bore (104) formed in the friction interface disc (12) of the clutch (C). The bore (104) is in fluid communication with the cylinder (30) of the clutch (10) which slideably mounts a piston (10) connected to the friction interface disc (12). Fluid pressure introduced into the cylinder (30) by conventional conduits (42) moves the piston (10) therein against the bias of a spring (56) when fluid flow from the cylinder (30) through the bore (104) is blocked by the overheating protection device (110). When heat resulting from clutch temperatures exceeding normal operating temperatures and conducted to the fitting (112) and the device (110) is sufficient to melt the fuse material (124), the plug (120) is ejected from the escape port (116) by the fluid pressure communicated from the cylinder (30) to the bore (104). The fluid pressure of the cylinder (30) will be insufficient to move the piston (10) against the bias of the spring (56) when the escape port (116) is not sealed by the plug (120) and fuse material (124).

20 Claims, 1 Drawing Sheet

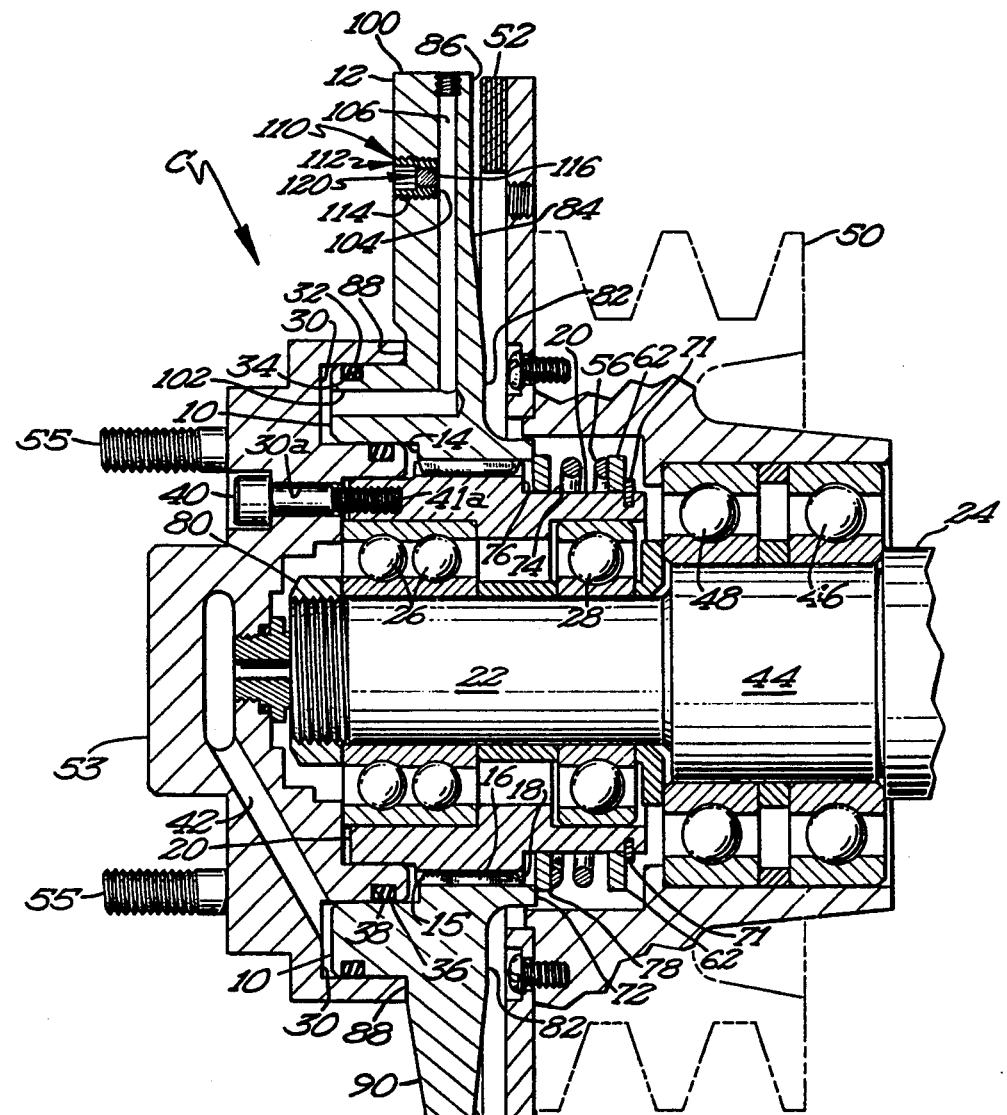
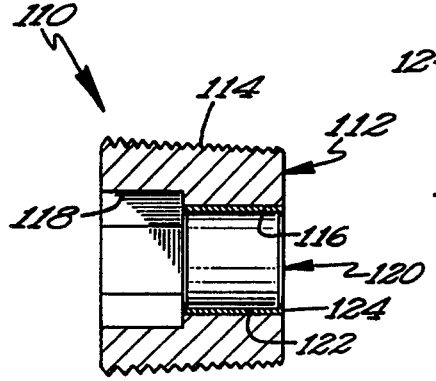
Fig 1
Fig 2
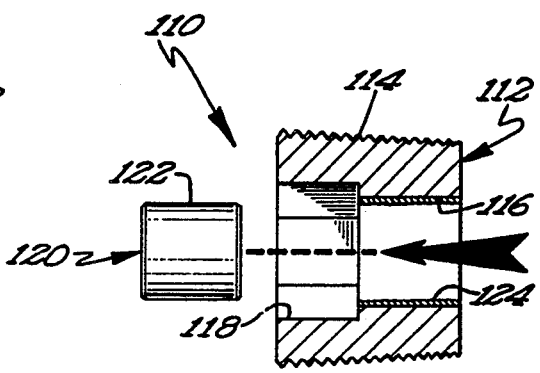
Fig 3

5,398,794

OVERHEATING PROTECTION DEVICE FOR ROTATIONAL CONTROL APPARATUS

BACKGROUND

The present invention generally relates to rotational control apparatus, relates particularly to clutches, and relates specifically to fan clutches.

Although fan clutches of the type shown in U.S. Pat. Nos. 3,253,687; 3,409,305; 3,762,517; 4,226,095; and 4,877,117 have proven to provide precise power, exceptional economy and dependable, long-lived durability, there exists a need to provide further improvements to result in a further advantageous clutch. Specifically, a need exists to avoid overheating the clutch from externally caused problems. For example, due to slippage resulting from rapid cycling of the clutch, heat is generated at the interface which the clutch is not able to dissipate fast enough causing overheating of the clutch. Such overheating can result in reduced operational life for the friction interface disc and the friction facing or other damage. Additionally, if the clutch becomes overheated at high levels and/or for extended periods of time, overheating of surrounding cooling components such as the fan belts can occur potentially causing harm thereto and may reach sufficient levels to initiate combustion such as of the fan belts.

SUMMARY

The present invention solves this need in the field of overheating protection devices for apparatus including a piston movable in a cylinder by fluid pressure such as a rotational control apparatus in the preferred form of a fan clutch by providing, in the preferred form, a heat conductive fitting received in a bore of the apparatus in fluid communication with the cylinder and having an escape port which is sealed in the normal temperature range of the apparatus and which allows escape of the fluid from the cylinder when the normal temperature range is exceeded.

In a preferred aspect of the present invention, the escape port is sealed by fuse material. In the most preferred aspect of the present invention, the fuse material holds a plug in the escape port in the normal temperature range of the apparatus but can not hold the plug in the escape port under fluid pressure from the cylinder when the normal temperature range of the apparatus is exceeded.

In the most preferred form, the overheating protection device is utilized in the interface disc of a rotational control apparatus in the form of a clutch, with the interface disc connected to and movable with the piston, and with the interface disc, the cylinder, and the piston rotatable about an axis.

It is thus an object of the present invention to provide a novel device for providing overheating protection.

It is further an object of the present invention to provide such a novel overheating protection device for apparatus including a piston movable in a piston by fluid pressure.

It is further an object of the present invention to provide such a novel overheating protection device for rotational control apparatus.

It is further an object of the present invention to provide such a novel overheating protection device for fan clutches.

It is further an object of the present invention to provide such a novel overheating protection device rotatable about an axis.

It is further an object of the present invention to provide such a novel overheating protection device providing a one-time, fuse-type usage.

It is further an object of the present invention to provide such a novel overheating protection device preventing resealing of an escape port after fluid release.

It is further an object of the present invention to provide such a novel overheating protection device located within a fluid passage bore.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a cross-sectional view from a 1 o'clock position to a 6 o'clock position of an overheating protection device for a rotational control apparatus in the most preferred form of a fan clutch according to the teachings of the present invention.

FIG. 2 shows a cross-sectional view of the overheating protection device of FIG. 1 in its sealed condition.

FIG. 3 shows a cross-sectional view of the overheating protection device of FIG. 1 in its fluid release condition.

The figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the figures of the drawings, the same numerals designate the same or similar parts. Furthermore, when the terms "first", "second", "internal", "radial", "axial", "inward", "outward", and similar terms are used herein, it should be understood that these terms have reference only to the structure shown in the drawings as it would appear to a person viewing the drawings and are utilized only to facilitate describing the invention.

DESCRIPTION

A rotational control apparatus according to the teachings of the present invention is shown in the drawings in the preferred form of a fan clutch and is generally designated C. In the most preferred embodiment of the present invention, clutch C is an improvement of the type shown and described in U.S. Pat. Nos. 4,226,095 and 4,877,117. For purpose of explanation of the basic teachings of the present invention, the same numerals designate the same or similar parts in the present figures and the figures of U.S. Pat. Nos. 4,226,095 and 4,877,117. The description of the common numerals and clutch C may be found herein and in U.S. Pat. Nos.

4,226,095 and 4,877,117, which are hereby incorporated herein by reference.

Referring to the drawings in detail, clutch C includes a first member to be driven in the form of an annular piston 10 which has formed thereon the annular friction disc portion 12 and the internal annular base portion 14. Formed internally of the axial hole 15 of the annular base portion 14 are the torque transmitting surfaces in the form of internal splines 16 which engage with the external torque transmitting surfaces in the form of splines 18 of the hub 20. The hub 20 is rotatably mounted on the reduced outward end 22 of stationary shaft 24 by means of the bearings 26 and 28 held thereon by bearing nut 80.

The numeral 30 designates an annular cylinder block in which is mounted the annular piston 10 with sealing engagement by means of the O-ring 32 mounted in the annular groove 34 formed in piston 10 and the O-ring 36 mounted in the annular groove 38 formed in cylinder 30. The cylinder 30 is secured to the hub 20 by means of a multiplicity of spaced bolts 40 which extend through clearance holes 30a in the cylinder block 30 and engage threaded holes 41a in hub 20. Air pressure is introduced into cylinder 30 by conventional conduit means 42.

Mounted on the reduced portion 44 of the shaft 24 are the bearings 46 and 48 which rotatably mount the sheave 50 on which is mounted the friction facing ring 52. The facing 52 is engaged by the friction disc portion 12 of the piston 10 when air pressure is introduced into cylinder 30 thereby clutching in the friction disc portion 12, the hub 20 and the cylinder block 30 on which a fan (not shown) may be mounted on the pilot extension 53 and secured by means of nut-equipped studs 55 on the cylinder block 30.

Base portion 14 of the piston 10 is formed with a radially extending shoulder 72 extending outwardly beyond the radially outward extent of splines 16. Hub 20 includes a reduced portion 74 formed axially inwardly from splines 18 defining a radially extending shoulder 76 extending inwardly beyond the radially inward extent of splines 18. Further provided is the compression coil spring 56. The numerals 62 and 78 designate washers received on reduced portion 74 of hub 20 which sandwich spring 56. Washer 62 is held on the axial end of hub 20 by a locking ring 71 received in a circumferential groove formed in reduced portion 74 of hub 20. Washer 78 is received on reduced portion 74 of hub 20 and abuts with shoulder 76 of hub 20 and shoulder 72 of base portion 14.

Friction disc portion 12 in the most preferred form is of solid construction. The facing engagement side of friction disc portion 12 includes a first, generally radially straight circumferential portion 82 which extends radially to a second, radially angled circumferential portion 84 which extends at a small angle in the range of 4° axially rearwardly to a third, generally radially straight, flat, circumferential portion 86. Portions 82 and 84 intersect at a radial extent generally equal to the radial surface of piston 10 including groove 34. Portions 84 and 86 intersect at a radial extent generally equal to the inner diameter of facing 52. Thus, when assembled, portion 86 is generally parallel to facing 52. Further, the side of friction disc portion 12 opposite facing 52 includes a first, generally radially straight circumferential portion 88 which extends radially to a second, radially angled circumferential portion 90 which extends at a small angle larger than the angle of portion 84 and in the preferred-form in the range of 9° 29′ axially inwardly to the peripheral edge of friction disc portion 12. Portions 88 and 90 intersect at a radial extent slightly larger than the intersection of portions 82 and 84 and in the most preferred form at a radial extent generally equal to the radial extent of annular cylinder block 30. Further, the side of friction disc portion 12 opposite facing 52 is free of air cooling fins in the form shown in the drawings as sufficient cooling may be provided by the fan blades when clutch C is utilized as a fan clutch in its most preferred form. However, friction disc portion 12 of clutch C can include air cooling fins if necessary or desired.

According to the preferred teachings of the present invention, the side of friction disc portion 12 opposite facing 52 includes first and second protrusions 100 extending radially from portion 88 in opposite diametric directions. This side of friction disc portion 12 may also include heat dissipating fins, not shown, circumferentially spaced between protrusions 100. A bore 102 extends axially from the free end of piston 10 towards but spaced from portion 82. A bore 104 extends axially from the side of friction disc portion 12 opposite facing towards but spaced from portion 86 in one of protrusions 100 radially spaced from and parallel to bore 102. An interconnect passage 106 extends radially between and provides fluid communication between bores 102 and 104, with bores 102 and 104 and passage 106 providing fluid communication from cylinder 30 to atmosphere. In the most preferred form, bore 104 includes left-handed internal threads. It should be appreciated that passage 106 could be formed as a bore extending radially from the outer periphery of friction disc portion 12 and intersecting with bores 102 and 104, with the radially outer end being suitably sealed such as by a plug.

Clutch C according to the teachings of the present invention includes a device 110 providing overheating protection resulting from externally caused problems such as rapid cycling. Particularly, device 110 provides a thermal fuse which blocks bore 104 with clutch C operating in normal temperature ranges and which allows dumping of fluid pressure from cylinder 30 when clutch C becomes overheated.

In the most preferred form, device 110 includes a fitting 112 formed of heat-conductive material such as brass. Fitting 112 has an outer surface 114 of a shape and size for sealing receipt in bore 104, with surface 114 including left-handed external threads for threadable receipt in the threads of bore 104 in the preferred form. Fitting 112 includes a first, cylindrical, center, fluid escape port or bore 116 extending from the axially inner end of fitting 112 to the axially outer end of fitting 112. Fitting 112 further includes a second center bore 118 extending from the axially outer end of fitting 112 towards but spaced from the axially inner end of fitting 112 and in communication with bore 116. Bore 118 in the most preferred form is hexagonal in cross section for receipt of a suitable wrench such as an Allen wrench to allow rotation of fitting 112 in bore 104.

In the most preferred form, device 110 further includes a plug 120 formed of heat-conductive material such as brass. Plug 120 has an outer surface 122 of a shape corresponding to bore 116 and of a size smaller than bore 116 to allow ease of slideable receipt of plug 120 in bore 116 without frictional forces. In the most preferred form, outer surface 122 of plug 120 is cylindrical in shape.

In the most preferred form, device 110 further includes fuse material 124 located between and interconnecting outer surface 122 of plug 120 with bore 116 of fitting 112. Fuse material 124 in the most preferred form is temperature dependent such as lead. Specifically, fuse material 124 has a first condition such as a solid phase for the preferred form of lead in normal temperature ranges for clutch C which seals plug 120 in bore 116 to prevent escape of fluid therebetween and with sufficient force to prevent the pressure of fluid from cylinder 30 from forcing plug 120 from bore 116. Fuse material 124 has a second condition such as a liquid phase for the most preferred form of lead in temperature ranges elevated from the normal temperature range where clutch C is subject to overheating. Specifically, fuse material 124 in the second condition can not hold plug 120 in bore 116 under the pressure of the fluid flowing from cylinder 30 through bores 102 and 104 and passage 106 and allows escape of fluid through bore 116.

Now that the basic construction of clutch C and device 110 has been explained, the operation and subtle features of device 110 can be set forth and appreciated. For sake of explanation, it will be assumed that device 110 is not installed in clutch C. Threaded, outer surface 114 of device 110 in its unblown and sealed condition with plug 120 sealed and held in bore 116 can be threaded into bore 104 of clutch C. It can be appreciated that a suitable wrench can be inserted into bore 118 to rotate fitting 112 to insure that device 110 is tightly secured and sealed in bore 104 of clutch C. Device 110 can be threaded to be flush with the outer surface of protrusion 100 and totally within bore 104 in the preferred form. When secured in bore 104, device 110 blocks passage of fluid from cylinder 30 to atmosphere through bores 102 and 104 and passage 106. With bore 104 blocked, clutch C operates in the same manner as clutch C without device 110 of the present invention such as those shown in U.S. Pat. Nos. 4,226,095 and 4,877,117. Specifically, in the absence of fluid pressure, spring 56 biases friction disc portion 12 to a disengaged position from friction facing ring 52 as shown in FIG. 1. When fluid is introduced into cylinder 30 through conduit means 42, the fluid pressure in cylinder 30 moves piston 10 out of cylinder 30 against the bias of spring 56 until friction disc portion 12 engages friction facing ring 52 and thus engaging clutch C. Thus, clutch C including device 110 would operate to engage and disengage depending upon the presence or absence of fluid pressure under normal temperature ranges where clutch C is not subject to overheating. However, in the event that the temperature of friction disc portion 12 should raise above the normal range of clutch C, protrusion 100 acts as a heat sink and heat is transferred from friction disc portion 12 to fitting 112 and device 110 sufficient to change fuse material 124 from its first condition to its second condition. In its second condition, fuse material 124 can not hold plug 120 in bore 116 under the pressure of the fluid flowing from cylinder 30. Thus, fluid is allowed to escape from cylinder 30 through bores 102, 104, 116, and 118 and passage 106. With the escape of fluid from cylinder 30, fluid pressure introduced into cylinder 30 through conduit means 42 will be insufficient to move piston 10 against the bias of spring 56, with spring 56 moving friction disc portion 12 to the disengaged position from friction facing ring 52. Thus, clutch C is prevented from being engaged when plug 120 is not present in bore 116 which then acts as an escape port for fluid pressure.

It can then be appreciated that the preferred construction of device 110 according to the preferred teachings of the present invention is particularly advantageous. As an example, plug 120 acts as a piston within bore 116 with the fluid pressure pushing on the axially inner end to completely remove plug 120 from bore 116. Without the presence of plug 120, bore 116 would have to be made smaller and/or a dramatically increased amount of fuse material 124 would be needed to seal bore 116. In either case, there may be a tendency for the fuse material to reseal and again block fluid pressure through bore 116 as fuse material 124 changes between its first and second condition. In fact, plug 120 according to the preferred teachings of the present invention tends to be expelled from bore 116 with considerable force by the fluid pressure when fuse material 124 changes from its first condition to its second condition such that resealing of plug 120 within bore 116 can not occur even if fuse material 124 should change back from its second condition to its first condition as plug 120 is no longer present in bore 116 in the most preferred form of the present invention. Additionally, the volume of fuse material 124 in device 110 according to the preferred teachings of the present invention is by itself insufficient to reseal bore 116 once plug 120 has been released. Thus, resealing of bore 116 after release of fluid pressure and plug 120 is prevented even in the event that fuse material 124 should change back from its second condition to its first condition.

Fitting 112 and fuse material 124 remaining in bore 116 of the blown device 110 according to the teachings of the present invention can be removed from bore 104 such as by inserting a suitable wrench into bore 118 to rotate fitting 112 out of bore 104. In the most preferred form, no provisions are made for preventing the loss of plug 120, and fitting 112 and fuse material 124 remaining in bore 116 can be disposed of in a proper manner. Thus, in the most preferred form, device 110 according to the teachings of the present invention provides a one-time, fuse-type usage. An unblown and sealed device 110 can be again inserted into bore 104 according to the teachings of the present invention, after clutch C has cooled to normal operating temperatures and preferably after the cause of the overheating has been eliminated.

Also, bore 118 of fitting 112 is believed to be advantageous according to the teachings of the present invention. As set forth previously, bore 118 provides the means to allow rotation of fitting 112 in bore 104 by a suitable tool. In the preferred form, bore 118 is located within the outer perimeter shape of fitting 112, with the tool being slideably received within bore 118. Thus, fitting 112 and device 110 can be located totally within bore 104 and specifically within the outer perimeter shape of protrusion 100. Thus, device 110 does not provide an obstruction or like projection for friction disc portion 12 on or upon which objects can catch. Also, the increased size of bore 118 allows for the ease of passage of plug 120 therethrough. Additionally, the presence of bore 118 reduces the axial length of bore 116 in the preferred form and thus the securement area of fuse material 124 to plug 120 while providing the total axial length of fitting 112 to insure sealing of fitting 112 in bore 104.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for providing overheating protection for an apparatus having a bore in fluid communication with fluid pressure, comprising, in combination: a fitting formed of heat-conductive material, with the fitting having an axially inner end, an axially outer end, and an outer surface adapted for sealing receipt in the bore of the apparatus; an escape port formed in the fitting and extending from the axially inner end to the axially outer end; a tool bore for receipt of a tool for positioning the fitting in sealing receipt in the bore and adapted to locate the fitting totally within the bore, with the tool bore being of a radial size larger than the escape port and extending from the axially outer end of the fitting towards but spaced from the axially inner end of the fitting and axially in line with and in communication with the escape port; a plug of a radial size smaller than the escape port and than the tool bore and of an axial length less than the escape port between the axially inner and outer ends; and a fuse material having a first condition in a normal temperature range and a second condition when the normal temperature range is exceeded, with the fuse material sealing the plug in the escape port for sealing the escape port of the fitting in the normal temperature range but with the fuse material unable to hold the plug in the escape port under fluid pressure and for allowing escape of fluid through the escape port when the normal temperature range is exceeded, with the plug passing from the escape port into the tool bore and beyond the axially outer end of the fitting when the fuse material is unable to hold the plug in the escape port.

2. The overheating protection device of claim 1 wherein the first condition of the fuse material is a solid phase and the second condition of the fuse material is a liquid phase.

3. The overheating protection device of claim 1 wherein the outer surface of the fitting includes external threads adapted for threadable and sealing receipt in internal threads formed in the bore.

4. The overheating protection device of claim 3 wherein the plug and the escape port are cylindrical in shape of a constant diameter.

5. The overheating protection device of claim 1 wherein the tool bore is hexagonal in cross section.

6. The overheating protection device of claim 1 wherein the plug and the escape port are cylindrical in shape.

7. The overheating protection device of claim 1 wherein the plug has an axial length equal to or less than the spacing of the tool bore from the axially inner end, with the plug positioned outside of the tool bore in the normal temperature range.

8. Rotational control apparatus comprising, in combination: a cylinder slideably mounting a piston for movement in a first direction by fluid pressure introduced into the cylinder; a bore in fluid communication with the cylinder; and a device for providing overheating protection in the event that the temperature of the apparatus exceeds normal operating temperature ranges for the apparatus comprising, in combination: a fitting formed of heat-conductive material, with the fitting having an outer surface for sealing receipt in the bore of the apparatus, with the fitting having an escape port; and means for sealing the escape port of the fitting in the normal temperature range of the apparatus and for allowing escape of fluid from the cylinder when the normal temperature range is exceeded to prevent fluid pressure from moving the piston in the first direction.

9. The rotational control apparatus of claim 8 wherein the cylinder and piston are rotatable about an axis.

10. The rotational control apparatus of claim 9 further comprising, in combination: an interface disc connected to and movable with the piston, with the bore formed in the interface disc.

11. The rotational control apparatus of claim 10 wherein the piston is slideably mounted in the cylinder for movement parallel to the axis, wherein the bore is parallel to and spaced from the axis radially outward of the piston and cylinder; and wherein the bore is in fluid communication with the cylinder by a radially extending passage formed in the interface disc.

12. The rotational control apparatus of claim 11 further comprising, in combination: a stationary shaft defining the axis.

13. The rotational control apparatus of claim 8 wherein the overheating protection device is of a one-time fuse-type requiring replacement after fluid is allowed to escape.

14. The rotational control apparatus of claim 8 further comprising, in combination.: means for moving the piston in a second direction opposite to the first direction.

15. The rotational control apparatus of claim 14 wherein the moving means comprises a spring.

16. The rotational control apparatus of claim 15 wherein the fitting has an axially inner end and an axially outer end, with the escape port extending in the fitting from the axially inner end to the axially outer end; and wherein the overheating protection device further comprises, in combination: a tool bore for receipt of a tool for positioning the fitting in sealing receipt in the bore and adapted to locate the fitting totally within the bore, with the tool bore being of a radial size larger than the escape port and extending from the axially outer end of the fitting towards but spaced from the axially inner end of the fitting and axially in line with and in communication with the escape port; a plug of a radial size smaller than the escape port and than the tool bore and of an axial length less than the escape port between the axially inner and outer ends; and a fuse material having a first condition in the normal temperature range and a second condition when the normal temperature range is exceeded, with the fuse material sealing the plug in the escape port for sealing the escape port of the fitting in the normal temperature range but with the fuse material unable to hold the plug in the escape port under fluid pressure and for allowing escape of fluid through the escape port when the normal temperature range is exceeded, with the plug passing from the escape port into the tool bore and beyond the axially outer end of the fitting when the fuse material is unable to hold the plug in the escape port.

17. The rotational control apparatus of claim 8 wherein the fitting has an axially inner end and an axially outer end, with the escape port extending in the fitting from the axially inner end to the axially outer end; and wherein the overheating protection device further comprises, in combination: a tool bore for receipt of a tool for positioning the fitting in sealing receipt in the bore and adapted to locate the fitting totally within the bore, with the tool bore being of a radial size larger than the escape port and extending from the axially outer end of the fitting towards but spaced from the axially inner end of the fitting and axially in line with and in communication with the escape port; a plug of a radial size smaller than the escape port and than the tool bore and of an axial length less than the escape port between the axially inner and outer ends; and a fuse material having a first condition in the normal temperature range and a second condition when the normal temperature range is exceeded, with the fuse material sealing the plug in the escape port for sealing the escape port of the fitting in the normal temperature range but with the fuse material unable to hold the plug in the escape port under fluid pressure and for allowing escape of fluid through the escape port when the normal temperature range is exceeded, with the plug passing from the escape port into the tool bore and beyond the axially outer end of the fitting when the fuse material is unable to hold the plug in the escape port.

18. The rotational control apparatus of claim 17 wherein the first condition of the fuse material is a solid phase and the second condition of the fuse material is a liquid phase.

19. The rotational control apparatus of claim 18 wherein the outer surface of the fitting includes external threads adapted for threadable and sealing receipt in internal threads formed in the bore.

20. The rotational control apparatus of claim 17 wherein the plug and the escape port are cylindrical in shape of a constant diameter.

* * * * *

UNITED STATES PATENT AND TRADEMARK OFFICE
CERTIFICATE OF CORRECTION

PATENT NO. : 5,398,794

DATED : March 21, 1995

INVENTOR(S) : David Walberg et al.

It is certified that error appears in the above-identified patent and that said Letters Patent is hereby corrected as shown below:

Title Page, item 56, column 2, after "Kingdom" insert
--264221 08/1968 Austria
0179210 04/1986 European
2242715 10/1991 United Kingdom--

Column 7, line 53, after "shape" insert --of a constant diameter--.

Signed and Sealed this

Twenty-seventh Day of May, 1997

*Attest:*

BRUCE LEHMAN

*Attesting Officer*     *Commissioner of Patents and Trademarks*